No. 820,228. PATENTED MAY 8, 1906.
A. MAUSER.
CASK, BARREL, DRUM, AND THE LIKE.
APPLICATION FILED APR. 4, 1904.
2 SHEETS—SHEET 1.
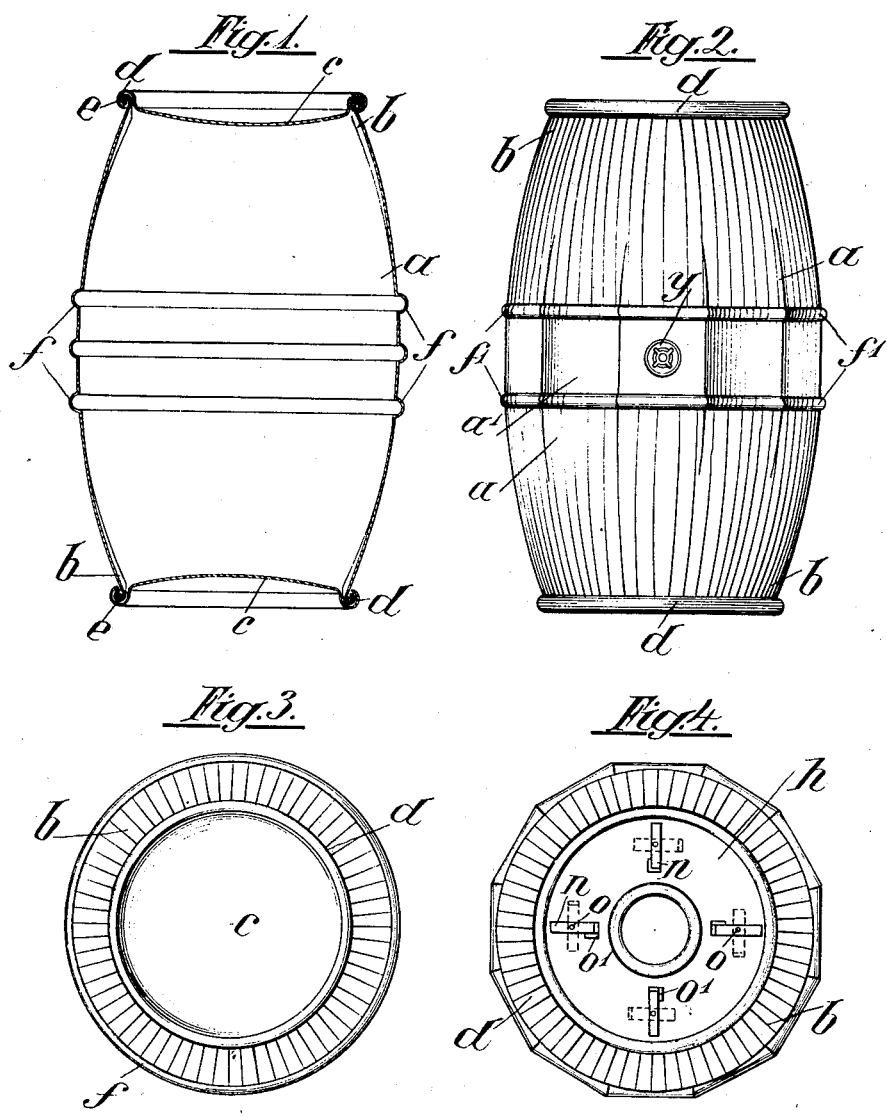
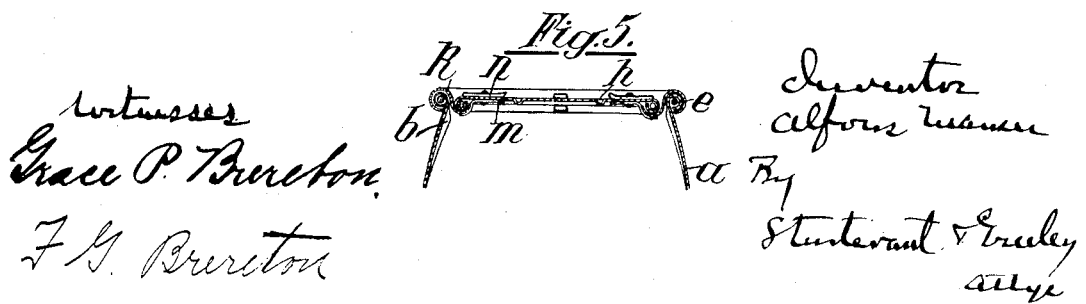

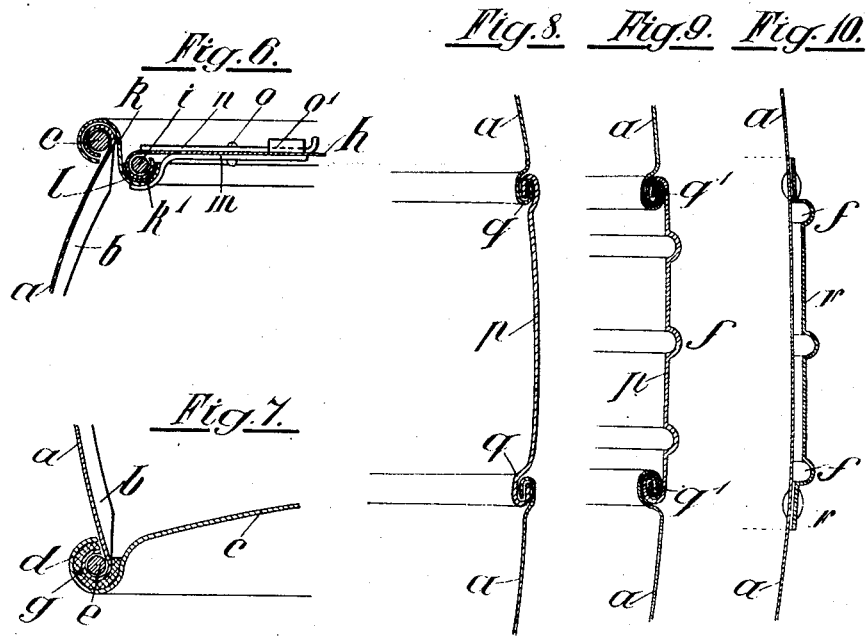
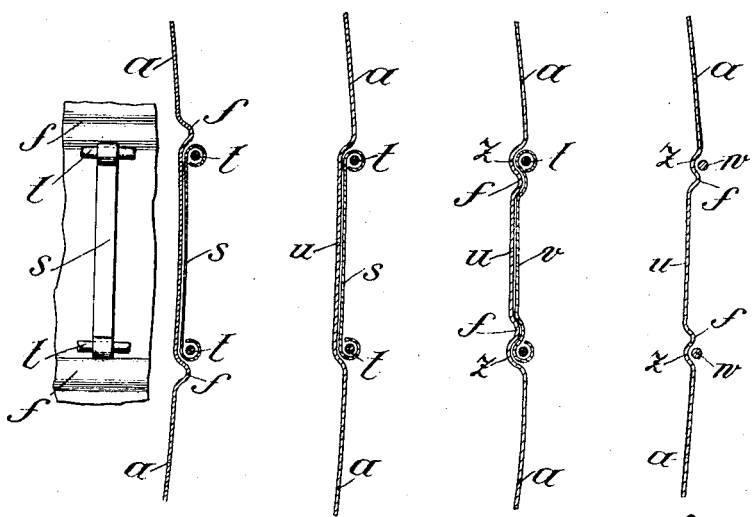

UNITED STATES PATENT OFFICE.

ALFONS MAUSER, OF COLOGNE, GERMANY.

CASK, BARREL, DRUM, AND THE LIKE.

No. 820,228.          Specification of Letters Patent.          Patented May 8, 1906.

Application filed April 4, 1904. Serial No. 201,439.

*To all whom it may concern:*

Be it known that I, ALFONS MAUSER, a citizen of the German Empire, residing at Cologne, in the Kingdom of Prussia, German Empire, have invented certain new and useful Improvements in and Connected with Casks, Barrels, Drums, and the Like, of which the following is a description, reference being had to the accompanying drawings and to the letters of reference marked thereon.

This invention has for its object a sheet-metal cask, barrel, or drum tapering toward both ends in such a way that grooves gradually becoming deeper toward both ends are formed in a suitable manner in the sheet-metal casing, which is at first made cylindrical, and thus the casing is caused to taper without waste of material while simultaneously increasing the strength of the cask, barrel, or drum. The ends of the cask or barrel are flanged or swaged onto the casing, for which object the corrugated casing edge is first pressed flat and then flanged. The ends are then flanged round this edge of the casing, if desired, a washer-band being inserted between them. If it is in some circumstances desired that one end of the cask be removable, thus forming a sort of lid, a separate ring attached to the casing is introduced between the cask-casing and the end, in the groove of which ring the lid which is provided with an edge all round is inserted, a washer being placed between and fixed thereto by means of revoluble bolts. The center part of the cask, barrel, or drum is suitably strengthened—for instance, by impressing a number of circular grooves or by placing thereon separate means of strengthening, such as hoops, rings, or the like. The sheet-metal casing may also, if desired, be made in three parts and a thicker plate employed for the center part. The separate parts of the casing and also the bottoms may be tightly connected with one another by folds or corrugations. It may also be preferable to make the cask polygonal in the middle instead of circular, in such a way that when lying on its side it cannot roll away, but will remain stationary, with its prismatic surfaces on the ground.

The cask or barrel may be of any suitable section, but usually a circular one is preferable. However, in order to save space—for instance, for export purposes—a rectangular section may also be adopted.

The object of the invention is shown as an example in the accompanying drawings.

Figure 1 is a longitudinal section of a sheet-metal barrel, cask, or drum; Fig. 2, an elevation of a circular sheet-metal cask or barrel, the middle part of which is prismatic in form; Fig. 3, a plan view of the sheet-metal cask, showing the bottom of same; Fig. 4, a plan view of a sheet-metal cask in which the bottom is removable; Fig. 5, a cross-section of the end of a cask with a removable bottom. Figs. 6 to 14 are on an enlarged scale and represent, in Figs. 6 to 9, means for connecting the parts of the cask and in Figs. 10 to 14 means for strengthening the middle part of the cask.

If the cask or barrel be intended to receive liquids, it may be provided with a bung-hole $y$, as shown in Fig. 2.

The sheet-metal casing $a$ of the cask or barrel, which casing is first made cylindrical or prismatic and is closed by means of a seam, is tapered toward both ends by grooves $b$, increasing in depth from the middle toward the ends, being impressed or formed therein. The edges are then pressed smooth for a little farther and flanged or swaged over a strong wire insertion $e$ or the like, Fig. 7.

The cask-bottom $c$, which may be made concave in any suitable manner, is swaged, by means of an edge $d$, over the edge of the casing, if desired, a washer-band $g$ being inserted where great tightness is required, and in this manner a very solid connection is obtained sufficiently strong to resist the rolling of the cask on its bottom edge. If one end is to be removable—that is to say, if the cask is to have a removable cover or lid—a ring $k$ is flanged on the edge of the casing of the cask, which ring has on its inner side a circular groove $k'$, Fig. 6. The lid or cover $h$ is laid in this groove, if desired, a washer-band $l$ being also inserted in such a way that the edge $i$ of the lid engages in the groove and is drawn into the groove by means of revoluble bolts $m$ engaging under the groove $k'$. If the bolts $m$ are turned laterally, they pass away under the groove $k'$, and the lid may be removed. The unfastening and fastening of the bolts $m$ take place by means of yokes $n$, lying over the lid, which yokes are firmly connected with the bolts $m$ by pins $o$ pivotal in the lid. This is preferably done by the pins $o$ being rectangular or similarly shaped in the part which passes through the lid while otherwise being round and the yokes n and bolts m fitting firmly on the rectangular part. In order that it may be seen from the outside of a cask whether the bolts m are secured or open, the yokes n have all a similar direction to the bolts m lying beneath them, and a projection o' for each of the yokes n is also provided on the lid h, which projections, if sealed to the yokes, prevent any unauthorized turning of the yokes n—that is to say, any unfastening of the revoluble fastening-bolts m, Figs. 4 and 6.

In the case of casks, Figs. 2 and 4, which have a prismatic form in the middle, the casing a is made prismatic at first. After the extending grooves b have been impressed the corrugated edges are rolled smooth and the round lid or end then attached thereto in the manner hereinbefore described.

If the cask-casing be formed of several parts, Figs. 8 and 9, the center part p is made of thicker plate and swaged or flanged onto the side parts a by means of simple folds q or double folds q', according as the cask is required to be more or less water-tight.

The simplest means of strengthening the middle part of the cask is by circular grooves f and f', which, of course, may also be employed when the cask-casing is formed in several parts, Fig. 9. If it is necessary that the middle part of the cask be further strengthened, a separate strengthening-band r is placed around the middle of the cask, Fig. 10, which may also be provided with circular grooves, and preferably stands a little away from the cask in order that if the hoop or band be damaged the cask shall not be damaged at the same time. Closed iron rings t, which lie beside the strengthening-ribs f and are connected one with another by means of hoop iron s, engaging through the rings, Fig. 11, may also be employed as further means for strengthening the cask. The solid or hollow rings t may, if desired, also lie in a vertical central part u of the cask-casing a and be retained in position by hoop iron s, both ends of which engage the rings, Fig. 12. The cask-casing a may also be provided in the middle with inwardly or outwardly impressed circular grooves z and f, respectively, and the rings may lie in the inwardly-impressed circular grooves z and be connected by hoop-iron v, Fig. 13, or the rings w may lie directly in the circular grooves z without being interconnected.

Of course a large number of methods of strengthening the middle part of the sheet-metal cask, barrel, or drum may be employed without departing from the scope of the invention.

All parts of the cask are held together by bending over or swaging, and thus rivets are only necessary when the middle part of the cask, barrel, or drum is strengthened by a hoop or band, Fig. 10.

The cask made in the manner hereinbefore described is of light weight both as compared with sheet-metal drums hitherto employed for similar purposes and also with wood casks of similar content. The cask can also be made considerably cheaper and is particularly suitable for export purposes where great strength of the package with as light a weight as possible is the most essential condition in order to obtain cheap freight and lessen custom-house expenses. A further considerable advantage of this sheet-metal-cask, barrel, or drum tapering to both ends consists in its convenient handling under transport. These casks may be easily turned on one point and also set up on end with very little trouble. By moving the cask when laid on its side up and down several times a certain oscillation may be produced, and then the cask may be easily set up on end, while in the case of cylindrical sheet-metal casks or drums a considerably greater expenditure of power is necessary—that is to say, more persons are required to handle the cylindrical iron drums.

The drum, cask, or barrel may be any suitable section—that is to say, its form may be round, rectangular, or otherwise—the cask-casing being first made of the desired sectional form—that is to say, cylindrical or prismatic from sheet metal—and then the tapering grooves impressed on both sides.

In cases where it is important to save space—for instance, in conveyance on board ship or for storage—rectangular casks, for instance, may be preferable to circular ones, as there is less waste space between them than is the case with the latter.

Having now particularly described and ascertained the nature of my said invention and in what manner the same is to be performed, I declare that what I claim is—

1. A sheet-metal barrel having a central bilge portion bounded by strengthening-ribs, both the bilge and ribs being polygonal, the walls of the barrel from the ribs toward the ends being circular in form.

2. A sheet-metal barrel having at one end an inwardly-extended grooved ring, a removable head or cover, having a beaded edge seated therein and pivotally-mounted clamping-arms carried by said head and arranged to engage below the ring for locking said head or cover in position.

In testimony whereof I affix my signature in presence of two witnesses.

ALFONS MAUSER.

Witnesses:
GUSTAV ELSNER,
WILHELM KUEPPERS.